The invention relates to metallurgy and more particularly to steel meallurgy and to methods of manufacturing pig iron and steel from iron ores and iron-oxide-containing waste materials.

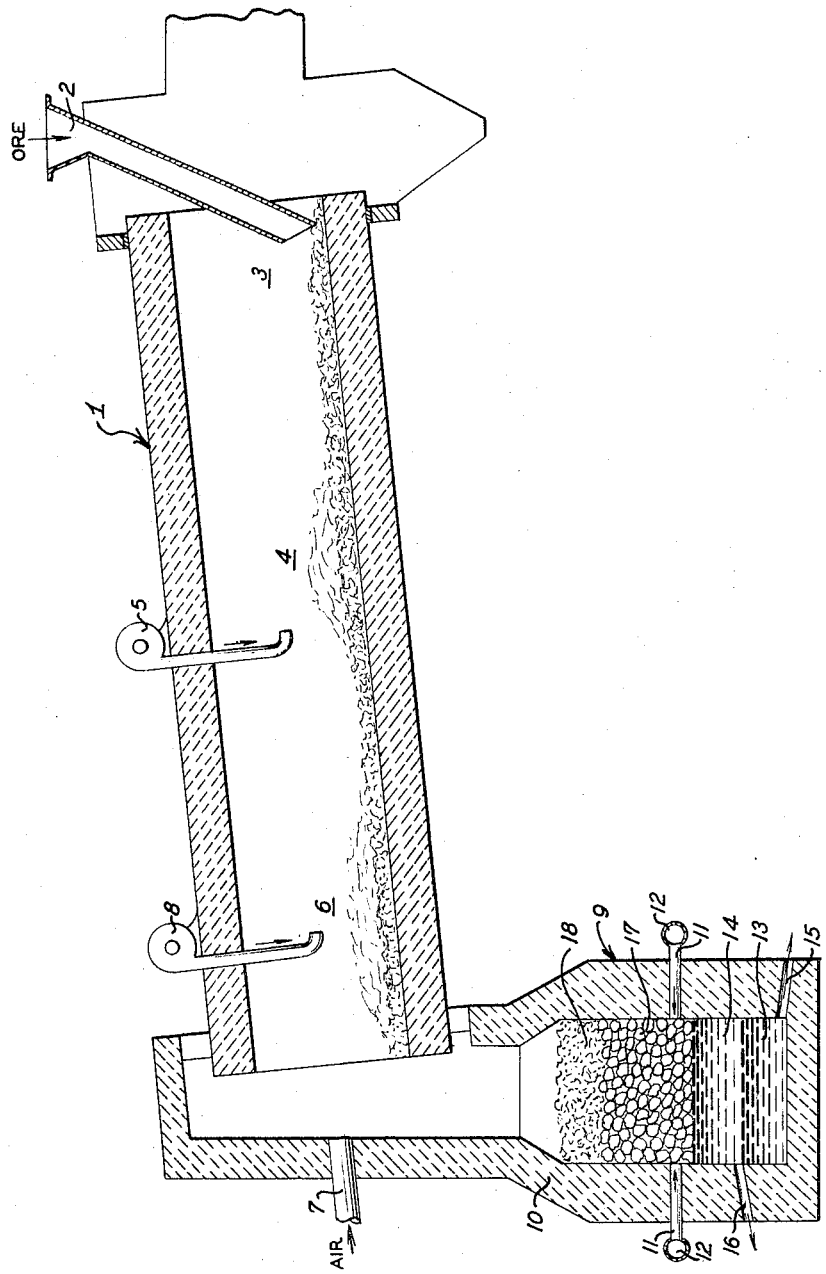
INVENTORS
HERMANN RÜTER
EGON CHERDRON
GERHARD BAYER 3,295,958
METHOD OF MANUFACTURING PIG IRON AND STEEL FROM IRON ORE AND IRON-OXIDE-CONTAINING WASTE MATERIALS
Hermann Rüter, Ludwigshafen (Rhine), Egon Cherdron, Limburgerhof, Pfalz, and Gerhard Bayer, Ludwigshafen-Rheingonheim, Pfalz, Germany, assignors to Gebruder Giulini G.m.b.H., Ludwigshafen (Rhine), Germany
Filed Jan. 21, 1964, Ser. No. 339,079
13 Claims. (Cl. 75—38)

In addition to the methods for the production of pig iron in blast furnaces, there have been proposed several methods for the production of iron from iron-oxide-containing ores and waste materials. The objects of these known processes, on the one hand, is to provide for the use of cheaper reducing agents in place of the metallurgical coke required in connection with the blast furnace processes for the production of iron, and on the other hand, to make provision for the use in the production of iron or steel, the fine ores, for example, iron-oxide-containing waste materials, as for instance, those readily available from alumina factories (red mud) and sulfuric acid factories (roasting residues). These latter materials are obtained in the form of very fine dispersions and are made suitable for use in blast furnaces only by an expensive preliminary treatment.

The heretofore known processes for the manufacture of pig iron and steel can be subdivided according to the following classifications:

(1) Briquetting of fine ore and fine coal followed by melting in a suitable furnace, as for example in a low shaft furnace or in a rotating cylindrical furnace.

(2) Preparation of a pasty mixture of fine iron ore blooms, fine ore slags and fine coal by working in a rotating cylindrical furnace followed by cooling and separation of the blooms and slag by magnetic separation techniques.

(3) Preparation of iron sponge from fine ore by reduction thereof utilizing solid or gaseous reducing agents in a turbulent bed process, rotating cylindrical kilns, or other suitable furnace followed possibly by magnetic separations.

(4) Production of a pitticite, in which the iron is present extensively or completely in the elementary form by the reduction of fine ore or waste materials with coal or a gaseous reducing agent in any of a number of types of ovens and preferably in a rotary furnace, following which the sinter formed is smelted for the purpose of separating the liquid iron from the liquid slag. This smelting or melting according to the various proposals is preferably carried out in na electric furnace, a low-shaft furnace, cupola furnace, or rotary furnace.

The present invention is directed to a process for the preparation of pig iron and steel classified with that type of production as set out in group 4.

In the accompanying drawing is shown a design of an arrangement for carrying out the method according to the invention, the single figure of the drawing being a vertical section of a preferred arrangement for the treatment of fine iron ore or iron-oxide-containing waste material.

One of the objects of the present invention is to provide an efficient method for preparing pig iron and steel from fine iron oxide containing ores or iron-oxide-containing waste materials.

Another object of the present invention is to provide a practical method for preparing pig iron and steel to replace methods hitherto known or proposed which have proven to be in one or more respects, commercially impractical, inefficient, or unadaptable and have, therefore, been discarded.

Another object of the instant invention is to provide a method for the preparation of pig iron and steel without having to use carbon-hydrogen fuel, solid, liquid or gaseous, for the reduction step and only a minimal amount of solid carbon for the melting step, sufficient heat being generated by the exothermic reactions involved in the overall treatment.

Still another object of the invention is to provide a method which will be capable of producing rapidly and at low cost pig iron and steel using fine ores and iron-oxide-containing waste materials as raw materials.

Other objects and advantages will be apparent as the invention is more fully disclosed.

In accordance with the objects of the present invention, we have developed a method of preparing pig iron and steel comprising a succession of treatments applied to an iron oxide containing fine ore or waste material. The steps of the present invention comprise:

(1) A reduction treatment of the iron-oxide-containing fine ore or waste material using for the reduction coal or a reducing gas wherein a sintered product is produced in which the iron is almost substantially completely present as reduced metal;

(2) A treatment of the reduced fine ore or waste material sintered so as to produce a molten body of metal from which the liquid slag can readily be separated from liquid iron or steel.

According to the invention, there is produced in the reduction of step 1 a sinter in which the iron is almost completely present as reduced metal. In order to effect this extensive reduction of the fine iron-containing ore or waste material in step 1, sufficient carbon is required to be supplied to comply with the equation $$Fe_2O_3 + 3C \rightarrow 2Fe + 3CO$$

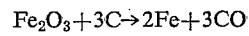

Most preferably the reduction of the $Fe_2O_3$ to Fe is effected so that about a 90% reduction is achieved. Preferably, the amount of carbon used is more than that stoichiometrically required in order to compensate for the possible presence in minor amounts of oxidizing agents in the gases used for heating in the furnace. The reduction can be carried out in any of the conventional furnaces; however, the rotating cylindrical kiln has proved most advantageous due to its favorable heat utilization properties and due to the fact that the sinter therein produced is in the desirable small piece form.

The subsequent treatment step 2, i.e. the smelting or melting of the iron sinter is carried out according to the invention in a zone of high turbulence which is formed overlying a red-hot coke layer. By blowing air into the layer of coke, there is produced a temperature in the coke layer falling above the melting temperature of the slag and iron. The exhaust gases which leave the coke layer serve to impart to the iron-sinter (pitticite) material falling from the reduction zone of the furnace downwardly onto the coke layer a whirling turbulent motion, as a result of which there takes place an extensive heat exchange and a rapid smelting in or melting of the sinter material. The melting metal droplets trickle down through the glowing coke layer, collect on the bottom thereof and are separated into liquid iron and liquid slag. The liquid iron and liquid slag are then separated, i.e. taken off in the known manner, as for example, in the blast furnace or foundry cupola.

In order to obtain a practical and efficient utilization of the heat for the purpose of using a possibly smaller amount of coke, it is necessary to maintain the coke layer in the iron melting furnace only so high that there occurs only an interaction of the oxygen contained in the blown-in air with the carbon whereby carbon dioxide is formed, but without there taking place a reaction of the formed carbon dioxide with the carbon giving rise to the formation of carbon monoxide. In this connection, the velocity of the blown-in air, as well as the temperature of the latter, are of importance. All of these three factors, i.e. air velocity, air temperature, coke layer height, etc. must be adjusted one to the other that the above-described effect is assured. In regard to the gas velocity, narrower limits are set in that only the small-sized iron sintered pieces are to have imparted thereto the whirling motion but no such motion is to be imparted to the coke material. Most advantageously, a coke layer of about 30–50 cm. in height, measured from the air injection level is employed. The height of the bed varies within the above range in accordance with numerous factors, not the least of which are the structural dimensions of the furnace, so that the height is required to be regulated depending on the various factors in each individual instance.

From the above, it can be appreciated that it is important to limit the grain size of the iron sinter so that it does not exceed a certain upper limit and that of the coke so that the same does not have too small a grain size. It is just as important, however, that the iron sinter does not have a grain size so small that the particles cannot be maintained in a whirling bed but are carried along with the exiting gas into the reducing furnace. Accordingly, in accordance with the invention, the reducing furnace is to be operated in such a manner that the reduced material in the first treatment zone of the furnace undergoes sintering to form small granulated particles of material. If, because of the properties of the raw materials, and their composition, this is not possible, it is advantageous to further treat the feed material as by granulation, crumbling, briquetting, or other like shaping procedure to produce a particle size of a maximum of 20 mm. and preferably a maximum of 10 mm. The furnace must thereafter be operated in such a manner that no further conglomeration of these granulates takes place in the sintering zone of the furnace. In the use of sludge-like materials, as starting materials, as a rule, there are formed small-sized agglomerates of the desired size range.

The exhaust gas, which leaves the turbulent fluidized layer having a temperature of 1100–1300° C., is passed into the rotary kiln where a large part of its heat is made use of, preferably for carrying out the remaining reduction taking place in the first treatment section of the rotary kiln furnace. The carbon-monoxide-containing reducing gases formed in the reduction are burnt using air for the burning simultaneously blown in over the charge in the rotary kiln as a result of which an energy source for the carrying out of a further reduction in the reducing zone of the furnace is provided. The energy conservation principles are per se known from the processes mentioned above under point 2 in connection with which the carbon monoxide-containing gases formed in the reduction by the combustion are used as a supply source for at least a part of the energy required to carry out the reduction in further reduction stages, or, alternatively, for heating up the charge or start feed material. In the latter processes, however, in contrast to the process in accordance with the present invention, the reduction of the rotary kiln material is effected through the supplying to the reduction of a fuel as a source for the necessary heat.

In accordance with the process of the invention, an extensive reduction of the fine ore or waste material is effected in the first treatment step in the rotary kiln. This is required in that the second treatment step or coke-bed-fluidized step takes place in a very short time within which a residual reduction necessary in the case of an incomplete reduction in the first stage no longer could be effected to the required degree. For this reason, it is advisable to have the mixture of ore and carbon (coal) supplied to the first reduction treatment step in the form of a finely granular charge assuring thereby that the reduction will take place most satisfactorily.

For the method of the present invention, there are suitable all of the iron ores available in a finely granular form and particularly those ores which, by their nature, are obtained in fine-granular structure, and as a result of which are not suitable for the blast furnace processes. Furthermore, for effecting the method of the invention, there are suitable iron-oxide-containing waste materials derived from the most varied of sources and industries, and which mostly are available in very finely divided form, and therefore only suitable for use in blast furnace processes after costly pretreatment. Examples of suitable iron-oxide-containing waste materials include the pyrite cinders, the insoluble residues of the alumina production according to the Bayer process (red mud), the sediments resulting in the reduction of nitrobenzene to aniline by means of iron decomposing residues, the roasting products obtained in the processing of iron sulfate resulting as a by-product in titanium white production, and the like. A special advantage of the process is that the high water content of some of these residues does not pose any problem, i.e., is noninterfering, insofar as the moist residues are mixed with the required amount of fine coal and this mix directly charged to the rotary kiln intake, the heat of the exhaust gas from the reduction section of the furnace serving to dry the moist feed. This feature represents a further aspect of the extremely favorable heat utilization properties of the invention, particularly since a separate drier is not required for drying the starting residues and sediments.

The introduction of the coke into the furnace which is required for the smelting in, i.e. smelting step, preferably takes place at the reduction oven inlet together with the feed material. As a result, the coke is preheated to the same temperature as the pitticite formed in the reduction furnace and passing downwardly in the form of small sinter pieces into the smelting-in furnace. This feature results in that the smelting-in process is additionally accelerated and the specific coke consumption of the process is kept as low as possible.

The most surprising and entirely novel features associated with this mode of operation as compared to the known processes is that the gases discharged from the smelting or melting furnace are almost free of carbon monoxide and other reduction gases—the exhaust gases leaving the furnace contain less than 10% of carbon monoxide and preferably less than 1%—and that the specific coke consumption is kept so low and further that even when cold air without any oxygen addition is introduced, a temperature is attained of which even the previously reduced sinter of ballast-rich, low-grade iron ores and iron-oxide-containing waste materials, such as, for instance the red mud derived in the production of alumina can be readily and effectively smelted and thereafter the steel or iron separated from the slag formed. It is well known, for example, in connection with the red mud sediments that because of their high content of ballast materials and the high melting temperatures thereof of 1300–1400° C., that this material has not been employed in smelting on any significant scale. Beyond that, however, even iron and steel production from low ballast iron ores in the described manner is an important technical advance in that, in addition to providing for the use of low-cost reduction coal in place of (blast furnace) coke or instead of reduction gases, there is provided in accordance with the invention a method for the efficient use of fine ores which could be processed in the blast furnace only after pretreatment, no preheating of the combustion air and/or any enrichment with oxygen being required and further, the exhaust gases from the reduction furnace are obtained practically free of carbon monoxide and hydrogen so that excellent heat economy is assured.

This is also the basic advance, i.e. difference with respect to German patent application 1,086,256, which describes a process in which an iron ore prereduced with reduction gases is thereafter smelted over red hot coke bed. However, in this process, the prereduced iron ore, together with fuel or fuel gases and preheated air enriched with oxygen are blown in above the coke bed and thereby the melting is achieved. As a result of such treatment, the exhaust gases leaving the smelting furnace contain very large amounts of carbon monoxide and hydrogen. The heated coke bed in the disclosed German application serves only to cause the recarburization of the iron. In the process according to the just noted German application the combustion air must first be heated to 800° C. and additionally enriched with oxygen although high grade ores are used (150 kilos of slag per 1,000 kilos of crude iron) while in the process of the present invention, using as starting material, red mud in which, for example, 1,000 kilos of crude iron per 1,700 kg. of slag are obtained, neither a preheating of the air nor an enrichment with oxygen is required.

The method of the invention is further illustrated by reference to the attached drawing.

A rotary kiln of conventional construction 1 is charged through a charging chute 2 with a mixture of fine ore, as for example an iron oxide containing waste material, small coal, and possibly flux materials. The feed can be introduced, either in the form of a dust, sludge, or as an agglomerate having grain sizes of up to 20 mm. and preferably a grain size of from 10 to 20 mm. At the same time, the required amount of coarse sized coke is introduced. In the furnace section 3, any water present in the feed is evaporated. In the furnace section 4, the volatile, combustible components of the coal are evolved and then, due to the heat available, the evolved materials are combusted directly in the furnace section 4, the energy or heat liberated in this connection being conserved for use later on in the process. In order that this combustion takes place, namely that the combustible components be burnt, the furnace gases at this point in the furnace must still contain sufficient oxygen or elsewise air must be introduced into the section 4 of the furnace through ventilator 5. In zone 6 of the furnace, the reduction of the $Fe_2O_3$ to Fe takes place whereby in addition to $CO_2$, also CO, is evolved. This carbon monoxide, just as the gaseous components produced from the coal in zone 4, is burnt in the originating zone, the oxygen required in this connection being introduced as air blown into the interior of the furnace either through a nozzle 7 or through one or more blowers 8 arranged on the furnace. The thereby extensively reduced material and the heated-up coke pass out of the rotary kiln and into successively arranged chamber 9 lined with a refractory brick 10. This chamber is provided at about the mid point thereof with several air injection nozzles 11 through which via a ring-shaped pipe line 12, cold or heated air is blown into the furnace. In the lower part of the chamber 9 a layer of liquid iron 13 is held and above the latter a layer of liquid slag 14 is provided, which, as required, can be drawn off through openings 15 and 16, respectively. Directly above the slag layer 14 is arranged the coke bed 17. The coke bed 17 is maintained at a temperature of 1300° C. by air blown in through outlets 12 and 11. On top of the coke bed 17, the turbulent bed 18 is formed of small pieces of iron sinter material dropping out of the reduction zone of the furnace and maintained in whirling fluidized movement by means of the hot exhaust gases evolving from the underlying coke bed. Because of the high temperature of the exhaust gases evolved from the coke pile 17 and the additional heat produced by radiation from the coke layer as well as the partial direct contact of the whirling iron sinter pieces with the upper side of the glowing coke layer, a rapid melting of the iron sinter pieces takes place, the molten material thus formed trickling downwardly through the coke pile combining with the liquid bath in the lower part of the furnace where separation into liquid iron and liquid slag takes place. The exhaust gases exiting from the whirling layer 18 and having a temperature of 1100–1300° C. pass directly into the rotary kiln and serve there for heating up the reduction furnace.

The iron and steel resulting from the process in accordance with the invention has a carbon content depending on the exact mode of operation of from 1–4% and can, in the conventional manner, be freed from any sulfur contained therein.

Although it is believed that the practice will be clear to one skilled in the art from the foregoing disclosure, the following simplified example is offered as further illustration:

Example

A sludge-like mixture of the following composition is charged as follows per hour into a rotary furnace having a length of 100 m. and a diameter of 1.80 m.:

12.5 TONS FILTER-MOIST RED SLUDGE
[Insoluble residue obtained in the production of $Al_2O_3$ according to the Bayer-process]

| | |
|---|---|
| Free water | 48.0%. |
| $Fe_2O_3$ | 26.05%. |
| $Al_2O_3$ | 10.10%. |
| $TiO_2$ | 2.86%. |
| $SiO_2$ | 5.02%. |
| $Na_2O$ | 3.71%. |
| Bound water | 3.25%. |
| CaO | 0.63%. |

1.3 TONS GROUND LIMESTONE

| | |
|---|---|
| CaO | 52–54%. |
| Grain size | 35%>90μ. |

1.75 TONS GROUND COAL

| | |
|---|---|
| Ash | 6.8.%. |
| Volatile constituents | 16–18%. |
| Grain size | 30%>90μ. |

The introduced sludge is dried in the rear portion of the furnace (having a length of about 30 m.) utilizing therefor the heat content of the combustion gases. The dried product constitutes a granular material having a grain size of 2–20 mm. The waste gases having high water content thereby produced have a temperature of 120–130° C.

The dried material is then passed through the rotary furnace within a period of 3½ to 4 hours and at its discharge has a temperature of 1100° C.

The reduction of the $Fe_2O_3$ to Fe contained in the red sludge thereby effected amounts to about 90%, the metallic iron formed being present in the sinter in finely divided form. The carbon monoxide which is produced in the reduction is burnt with air, introduced into the furnace at several different places, and this furnishes a substantial part of the heat required for the reduction.

In the furnace the carbon monoxide and the volatile constituents originating from the reduction coal are completely burnt by controlling the conditions within the furnace.

In addition to the sludge-like mixture, there are charged hourly into the rotary furnace 600 kg. of crushed coke having a gram size of 60–80 mm., which is also heated at its discharge to about 1100° C. The reduced material and the coke, which both possess a temperature of about 1050–1100° C, are permitted to drop into a melting furnace positioned directly beneath the rotary furnace outlet. The melting furnace has a diameter of 140 cm. and is filled with glowing (incandescent) coke having a grain size of 60–80 mm. to a height where the coke surface is about 50 cm. above the water-cooled air introduction nozzles. 6000 m.³ of cold air are introduced through these nozzles per hour into the coke laker which has a temperature of about 1600° C. The sintered material falling onto the surface of the glowing coke is set into whirling fluidized motion by the hot waste gases and is thereby melted down within a very short time. The molten particles pass downwardly through the hot coke bed and collect as a body of molten metal in the under portion of the furnace separating out into two separate layers.

Iron and slag are tapped from the body of molten metal from time to time in the conventional manner.

From the above description of the method of the present invention, it is apparent that it is adapted to wide use and application in the production of iron and steel from a wide variety of fine iron containing ores and iron oxide containing waste materials. While, as a specific embodiment, we have described the application of the method of the present invention to red mud, it is apparent that we are not to be limited thereby as the same sequence of steps of the method described is equally as well applicable to other iron containing starting materials. The only modifications of the process described necessary for such other starting materials are modifications in the time, temperature, and gas compositions in each specific step to adapt the step to produce the desired result of the method as it has herein been described.

In view thereof all such modifications and adaptations of the present invention are contemplated or made for within the scope of the following claims:

We claim:
1. The method of preparing pig iron and steel from a member selected from the group consisting of fine grain iron-oxide containing ores and waste materials which compromises the steps of—treating a mixture of such a fine grain iron-oxide containing material and finely ground carbon in a reducing zone whereby a particle form sinter product is obtained in which at least 90% of the $Fe_2O_3$ originally present in said fine grain iron oxide containing material is reduced to free metal (Fe) thereafter melting the reduced sinter product by imparting thereto a turbulent fluidized motion by blowing a stream of air upwardly and through an underlying bed of heated coke while preventing fluidization of said coke, conducting the molten metal droplets thereby formed from said fluidized sinter product downwardly and in intimate contact with said bed of heated coke, coalescing the discrete droplets of molten metal into a body of molten metal and separately collecting the molten slag from the body of molten metal thereby formed.

2. The method of claim 1 wherein the stream of air blown into the bed of coke is cold air.

3. The method according to claim 2 wherein the bed of coke is maintained at a temperature of about 1500–1700° C.

4. Method according to claim 1 wherein the stream of air blown into the bed of coke is cold air and the gas derived following contact of said cold air with the heated coke and reduced sinter product has a temperature in excess of 1200° C. and recycling said hot gas to said reduction zone.

5. Method according to claim 1 wherein the exhaust gas obtained following contact of the air with the heated coke and reduced sinter product contains less than 10% of carbon monoxide.

6. Method according to claim 1 wherein the exhaust gas derived following contact of the air with the heated coke and reduced sinter product contains less than 1% of carbon monoxide.

7. Method according to claim 1 wherein the exhaust gas derived following contact of the air with the heated coke and reduced sinter product contains less than 10% of carbon monoxide and has a temperature in excess of 1200° C.

8. The method according to claim 1 which comprises introducing the coke required for said melting step together with said starting mixture into said reducing zone whereby the coke is preheated to the same temperature as the sinter product formed in said reducing zone.

9. The method according to claim 1 wherein said starting material is present in a form having a particle size of up to 20 mm.

10. The method according to claim 1 wherein said starting material is present in a form having a particle size of up to 10 mm.

11. The method of preparing pig iron and steel from a member selected from the group consisting of fine grain iron oxide containing ores and waste materials in the form of liquid containing sludges which comprises the steps of treating a mixture of such a sludge and finely ground carbon in a reducing zone whereby a particle form sinter product is obtained in which at least 90% of the $Fe_2O_3$ originally present in said sludge is reduced to free metal (Fe), thereafter melting the reduced sinter product by imparting thereto a turbulent fluidized motion by blowing a stream of air upwardly and through an underlying bed of heated coke while preventing fluidization of said coke, conducting the molten metal droplets thereby formed from said fluidized sinter product downwardly and in intimate contact with said bed of heated coke, coalescing the discrete droplets of molten metal into a body of molten metal and separately collecting the molten slag from the body of molten metal thereby formed.

12. The method according to claim 11 wherein the stream of air blown into the bed of coke is cold air and the bed of coke is maintained at a temperature of about 1500–1700° C., and the exhaust gas derived following contact of said cold air with said heated coke and said reduced sinter product has a temperature in excess of 1200° C. and is recycled to said reducing zone wherein at least a portion of said hot exhaust gas is used to evaporate the liquid present in said sludge.

13. The method of claim 11 wherein said starting material is a sludge obtained in the manufacture of alumina.

References Cited by the Examiner
UNITED STATES PATENTS

| | | | |
|---|---|---|---|
| 404,183 | 5/1889 | Eames | 75—36 X |
| 1,507,397 | 9/1924 | Moldenke | 75—43 |
| 1,599,885 | 9/1926 | Grace | 75—38 X |
| 2,035,550 | 3/1936 | Karwat | 75—38 X |
| 2,500,553 | 3/1950 | Lykken | 75—33 X |
| 2,750,277 | 6/1956 | Marshall | 75—38 |
| 2,806,779 | 9/1957 | Case | 75—38 X |

DAVID L. RECK, *Primary Examiner.*

H. W. TARRING, *Assistant Examiner.*